(12) United States Patent
Price

(10) Patent No.: US 7,017,527 B2
(45) Date of Patent: Mar. 28, 2006

(54) PET COLLAR WITH RETRACTABLE LEASH

(76) Inventor: Ryan Price, 5491 Roundtree Dr., Unit C, Concord, CA (US) 94521

( * ) Notice: Subject to any disclaimer, the term of this patent is extended or adjusted under 35 U.S.C. 154(b) by 0 days.

(21) Appl. No.: 10/810,465

(22) Filed: Mar. 25, 2004

(65) Prior Publication Data

US 2005/0211189 A1 Sep. 29, 2005

(51) Int. Cl.
*A01K 27/00* (2006.01)
(52) U.S. Cl. ...................................... 119/794
(58) Field of Classification Search ............... 119/794, 119/796, 770, 789, 792; 224/184
See application file for complete search history.

(56) References Cited

U.S. PATENT DOCUMENTS

| | | | | |
|---|---|---|---|---|
| 2,314,504 A | * | 3/1943 | Lifchultz | 242/379.2 |
| 2,919,676 A | * | 1/1960 | Schneider | 119/796 |
| 2,919,678 A | | 1/1960 | Schneider | |
| 4,328,767 A | * | 5/1982 | Peterson | 119/794 |
| 4,384,548 A | * | 5/1983 | Cohn | 359/518 |
| 4,655,172 A | * | 4/1987 | King | 119/792 |
| 4,892,063 A | * | 1/1990 | Garrigan | 119/795 |
| 4,977,860 A | * | 12/1990 | Harwell | 119/794 |
| 5,161,486 A | | 11/1992 | Brown | |
| 5,435,272 A | * | 7/1995 | Epstein | 119/770 |
| 5,435,273 A | | 7/1995 | Landis et al. | |
| 5,816,198 A | | 10/1998 | Peterson | |
| D417,318 S | | 11/1999 | Lyons | |
| 6,474,270 B1 | * | 11/2002 | Imes | 119/796 |
| 6,513,460 B1 | | 2/2003 | Fountoulakis | |
| 6,553,944 B1 | | 4/2003 | Allen et al. | |
| 6,581,547 B1 | | 6/2003 | Austin | |
| 6,792,893 B1 | * | 9/2004 | Quintero et al. | 119/796 |
| 2002/0035968 A1 | | 3/2002 | Prusia et al. | |
| 2002/0096128 A1 | | 7/2002 | Cohn | |
| 2003/0106501 A1 | | 6/2003 | Austin | |

FOREIGN PATENT DOCUMENTS

| | | |
|---|---|---|
| FR | 225951 A | 8/1975 |
| GB | 14541 A | 0/1893 |
| WO | WO 90/034728 | 4/1990 |

\* cited by examiner

*Primary Examiner*—Teri Pham Luu
*Assistant Examiner*—Bret Hayes
(74) *Attorney, Agent, or Firm*—Rosenfeld Law Corporation

(57) ABSTRACT

An integrated pet leash comprising a pet restraint, handle, retractors fastened to the outer side of the collar, and flexible elongated members. The flexible elongated members are coupled between the ends of the handle and the retractors. The retractors exert a force on the flexible elongated members toward the restraint. Additionally, the handle may include a detachable fastener to lock the collar-leash to poles, fence posts, parking meters, and the like.

18 Claims, 6 Drawing Sheets

PET COLLAR WITH RETRACTABLE LEASH

FIELD OF THE INVENTION

The present invention relates generally to pet collar, and more specifically, to a pet collar having a retractable and lockable leash integrated into the collar.

BACKGROUND OF THE INVENTION

Pet owners are routinely confronted with the inconvenience of the standard pet collar, which requires a separate, detachable leash for maintaining control of their pet. At times, pet owners may only need to use a leash for short periods of time under certain circumstance, such as when crossing a street or in the park when confronted with an aggressive dog. These situations require quick access to the leash. Also, pet owners may desire to quickly and easily tie the leash to a pole while entering a store. With the standard collar and leash, pet owners must carry the leash separately and may be inconvenienced by the time it takes to attach and detach the leash to the collar.

The time required to gather the leash and attach it to the collar is extremely problematic for pet owners confronted with increasingly stringent leash laws. The ability to quickly leash a pet can save pet owners the hassle and expense of fines for violation of leash laws.

An integrated collar and leash has been disclosed in U.S. Pat. No. 5,816,198 issued to Peterson and entitled Counter-weighted Pet Leash Retracting Collar. Peterson discloses a pet collar with a reflective strip, a leash, a counterweight and a leash retractor. The counterweight is needed to counterbalance the weight of the leash retractor and to ensure that the leash handle always comes to rest on the back of the animal's neck where it is easy for the user to access the leash handle. The extra weight can be cumbersome to the animal.

Another integrated collar and leash has been disclosed in U.S. Pat. No. 6,581,547 issued to Austin, which eliminates the need for the counterweight. In Austin, the leash feeds through a portion of the collar into a casing that stores the majority of the leash when not in use. The casing holds a coiled spring that is coupled to one end of the leash and provides the retractability. The opposite end of the leash forms a handle and is removably attached to the outside of the collar to provide access. The handle requires use of a fastener to attach the leash to the collar when not in use.

Neither Peterson nor Austin discloses the use of a locking mechanism for quickly securing the leash to an object such as a pole, signpost, or parking meter. Also, both disclose the use of a separate handle that is not integrated into the collar. In the case of Austin, the handle needs to be attached to the collar by a fastener to prevent the collar from hanging loose when not in use. As for Peterson, the handle is in the form of a cylindrical handle, which dangles from the collar when not in use.

An example of a locking leash is disclosed in U.S. Pub. No. 2002/0035968 issued to Prusia et al. and entitled Locking Leash and Collar System. Prusia shows a leash with a pet-securing region and handle region. The leash attaches to the collar in the standard manner.

The present invention provides an improved integrated collar-leash, as well as integrating a locking mechanism into the leash portion of the collar-leash.

SUMMARY OF THE INVENTION

The present invention generally is an integrated pet leash comprising a pet restraint, handle, retractors fastened to the outer side of the collar, and flexible elongated members. The flexible elongated members are coupled between the ends of the handle and the retractors. The retractors exert a force on the flexible elongated members toward the restraint. Additionally, the handle may include a detachable fastener to lock the collar-leash to poles, fence posts, parking meters, and the like.

The present invention has other objects and advantages which are set forth in the description of the Detailed Description of the Invention. The features and advantages described in the specification, however, are not all inclusive, and particularly, many additional features and advantages will be apparent to one of ordinary skill in the art in view of the drawings and specification herein.

DETAILED DESCRIPTION

Overview

Figure 1:
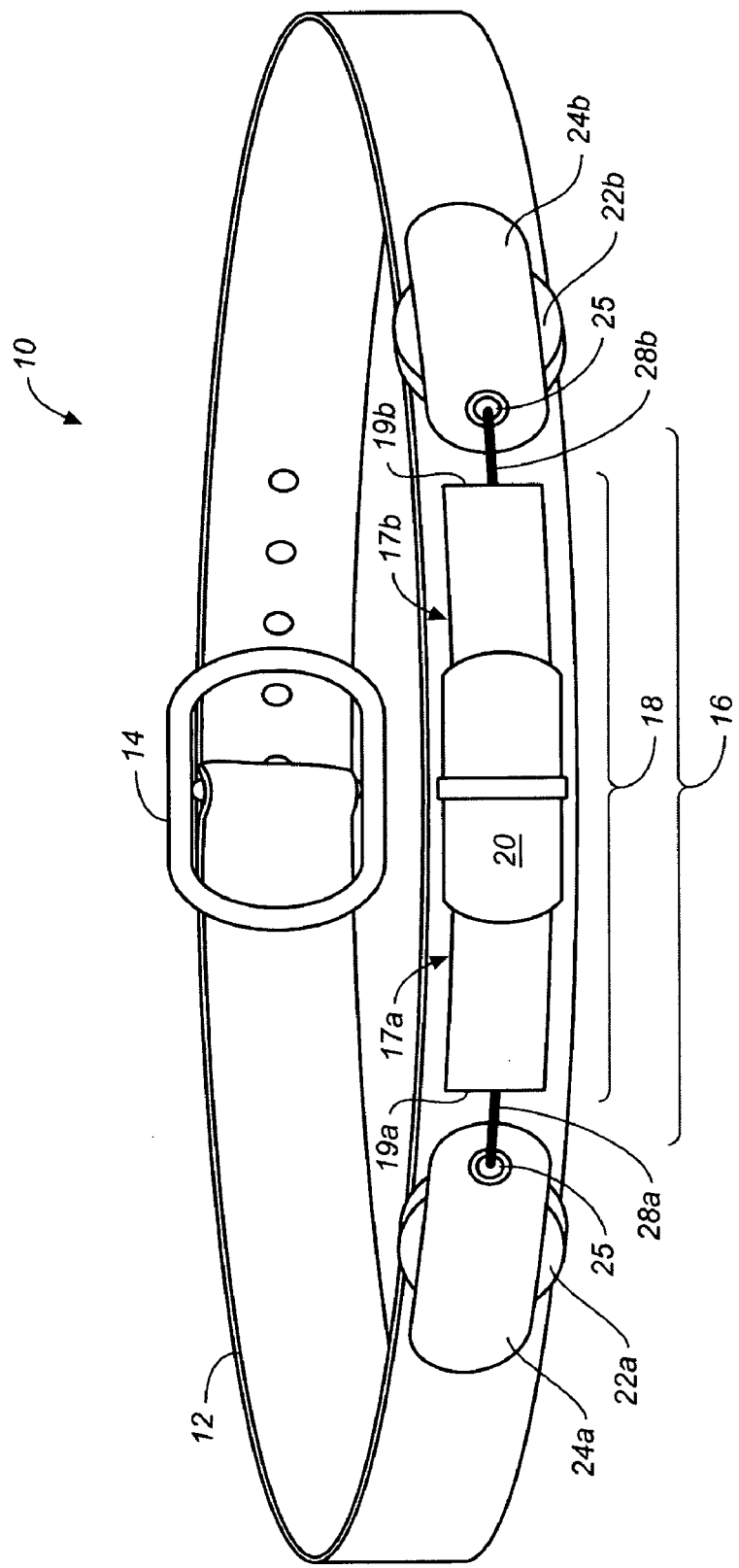
FIG. 1 is a perspective view of the integrated collar-leash with the leash portion retracted.
Figure 2:
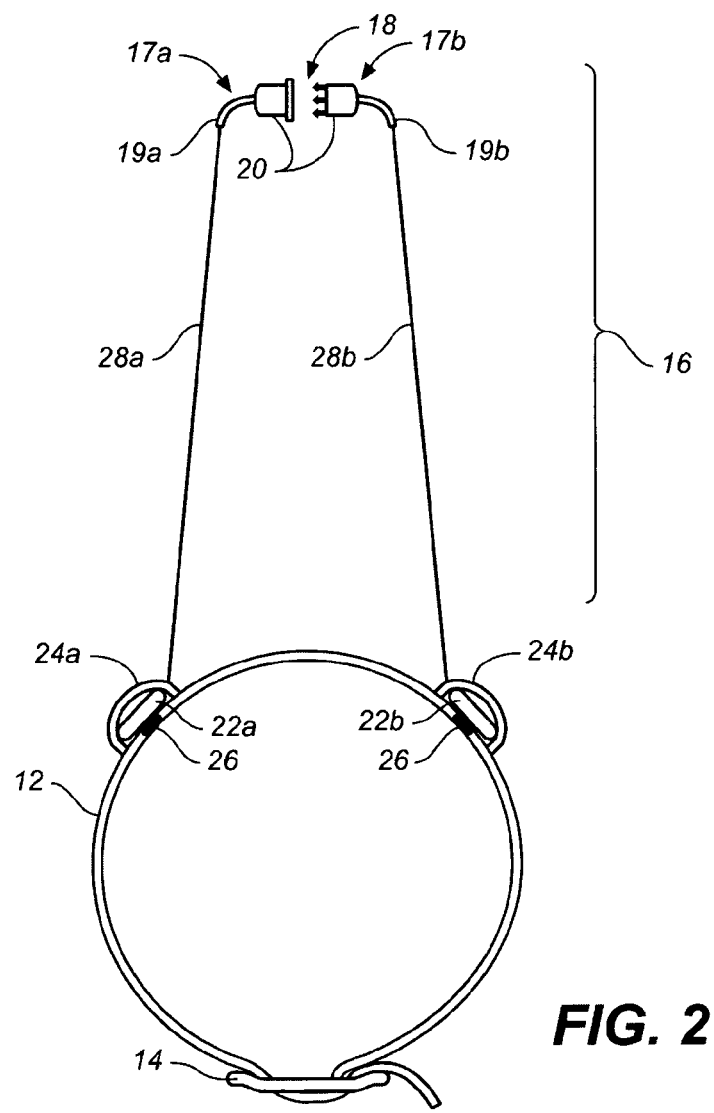
FIG. 2 is a frontal view of the integrated collar-leash with the leash portion extended.

The preferred embodiment of the integrated collar-leash is depicted in FIGS. 1–4 with leash in both the retracted and extended positions. Collar-leash 10 includes collar portion 12, collar buckle 14, leash portion 16, handle portion 18, buckle 20 which is part of and incorporated into handle portion 18, retractors 22a and 22b (collectively, referred to as retractors 22), and retractor covers 24.

Figure 3:
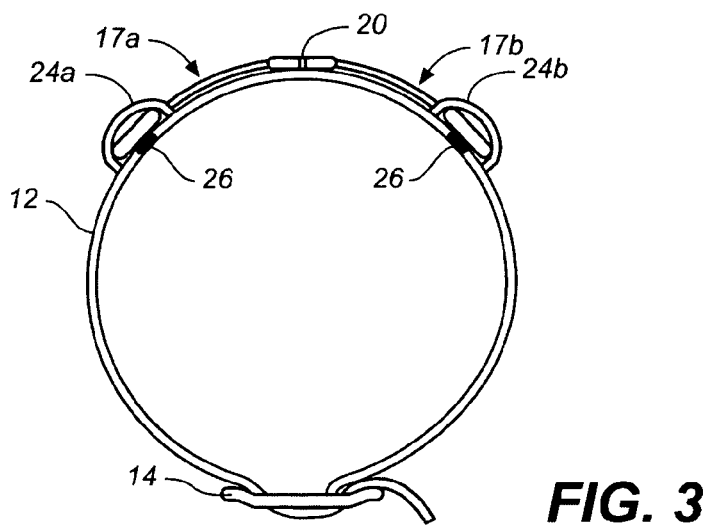
FIG. 3 is a frontal view of the integrated collar-leash with the leash portion retracted.
Figure 4:
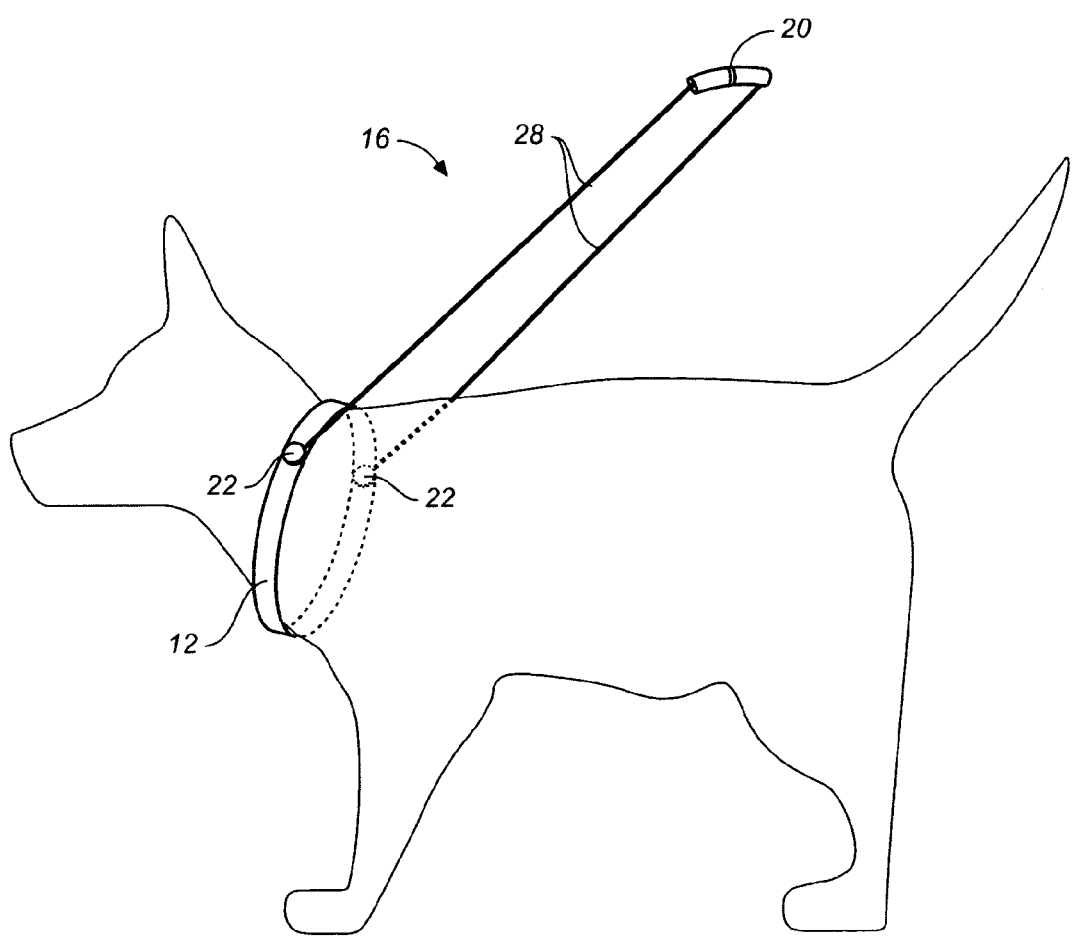
FIG. 4 depicts the integrated collar-leash in use on an animal with the leash portion extended.

Collar-leash 10 is depicted in collar mode in FIG. 3. As shown, leash portion 16 is retracted so that collar-leash 10 functions as a pet collar. In contrast, collar-leash 10 is depicted in leash mode in FIG. 2. As shown, leash portion 16 is extended so that collar-leash 10 functions as both a leash and collar. Collar portion 12 functions as the restraint for the pet as shown in FIG. 4.

Retractors 22 are fixed to the exterior side of collar portion 12 at a distance apart approximately equal to the width of the average human hand (approximately 3–4 inches). Rivets 26 or any one of many known means for fastening objects to leather or nylon such as punch buttons are used the fasten retractors 22 to collar portion 12.

Optionally, retractor covers 24 are stitched over retractors 22 to provide additional fastening support and protect retractors 22 from potential impact when worn by a pet. Retractor covers 24 each have a riveted hole for allowing leash portion 16 to pass through. Retractors 22 having a sufficiently durable housing 30 and a strong connection by way of rivets 26 will obviate the need for retractor covers 24.

Figure 5:
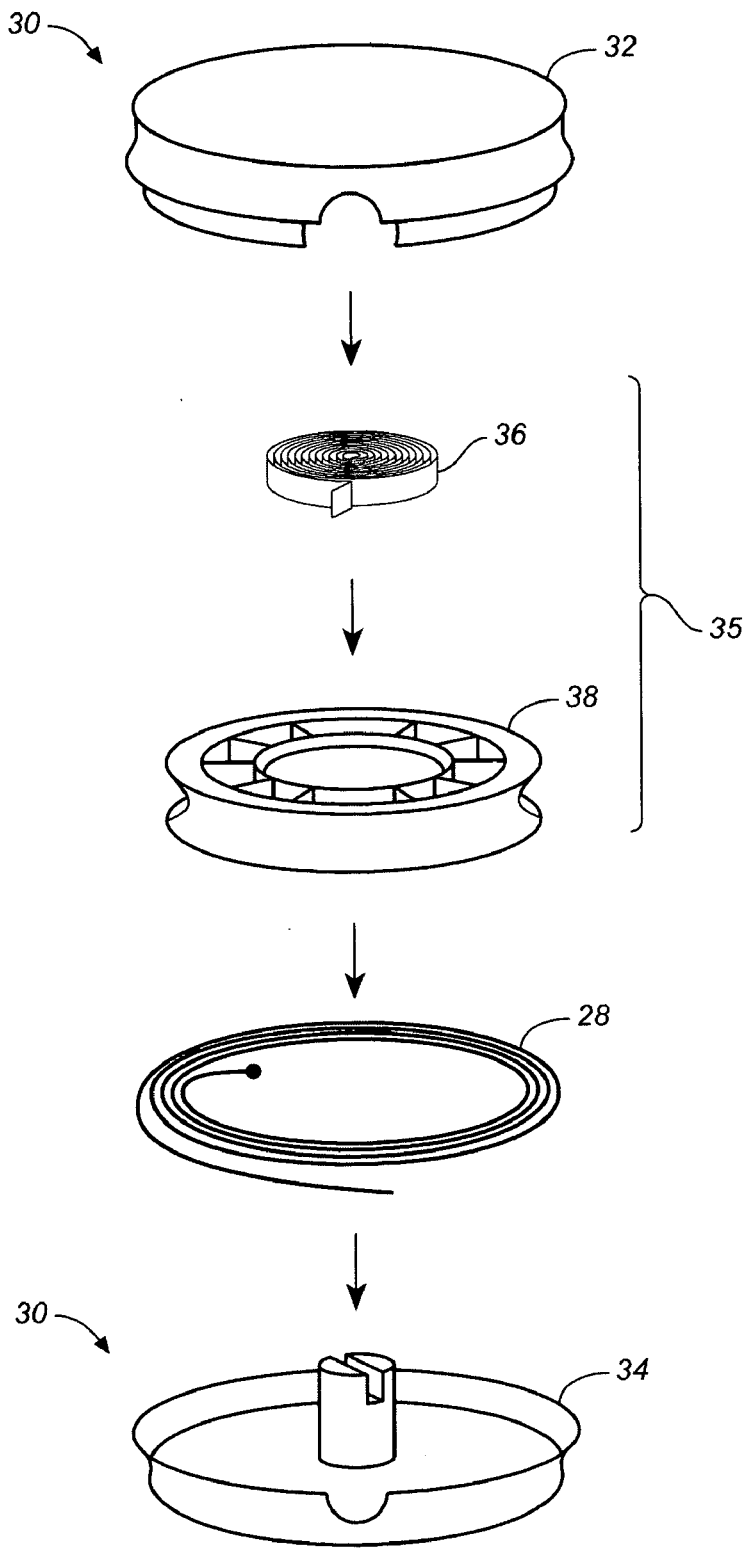
FIG. 5 is an exploded view of a retractor.

Retractors 22 are preferably spring-loaded retractors such as RT-03S steel metal wire retractable reels made by UMX. The structure of a spring-loaded retractor 22 is shown in FIG. 5. Retractor 22 includes housing 30 comprising a top cap 32 and bottom cap 34. Within housing 30 is spring loaded retraction mechanism 34 comprising spring coil 36 connected to the inside of dense plastic spool 38. Thin, flexible steel cable 28 is wrapped around the outer side of spool 38 and locked to spool 38 by a knot pinched or wedged in spool 38. Spring coil 36 maintains the steel cable 28 wound into a coil within housing 30 when counter force is being exerted on steel cable 28.

Leash portion 16 is formed by handle portion 18 (which is separable for locking purposes into two portions 17a and 17b, collectively referred to as separable handle portions 17) and two separate flexible cables 28a and 28b (collectively, referred to as flexible cables 28), which are made of a flexible, thin and strong material such as steel cable, nylon cord, or the like. Flexible cable 28a is attached between retractor 22a and end 19a of handle portion 18. Flexible cable 28b is attached between retractor 22b and end 19b of handle portion 18. This configuration causes the retractors 22 to apply a constant force on flexible cables 28 that pulls handle portion 18 toward collar portion 12.

Handle portion 18, when retracted as shown in FIGS. 1 and 3, is positioned between and held in place by the retractive force of retractors 22. This prevents handle portion 18 from hanging loose from collar portion 12 so that handle portion 18 will not interfere with the pet's ability to run or walk, or get caught on objects such as bushes and trees. Collar buckle 14 is positioned opposite (180 degrees around collar portion 12) handle portion 18.

Figure 6:
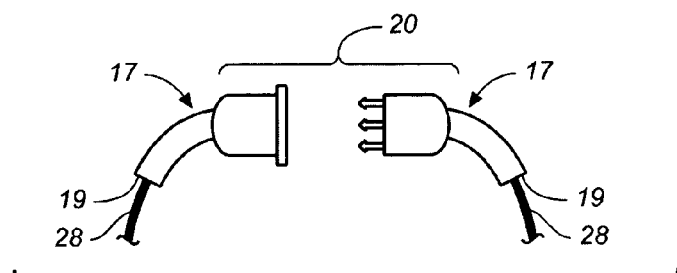
FIG. 6 is an exploded view of the latch mechanism incorporated into the handle portion of the leash.

Additionally, as depicted in FIG. 6, handle portion 18 is equipped with a detachable fastener such as latch 20. When leash portion 16 is extended, latch 20 may be disengaged. Each extension of leash portion 16 can be placed around an object and latch 20 re-engaged in order to lock collar-leash 10 to an object, such as a pole, fence post or parking meter.

Figure 7A:
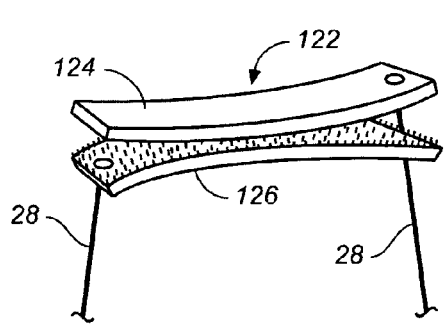
FIGS. 7a and 7b are perspective views of the double strap embodiment of the hook and loop fasteners incorporated into the handle portion of the leash in open and closed mode, respectively.
Figure 7B:
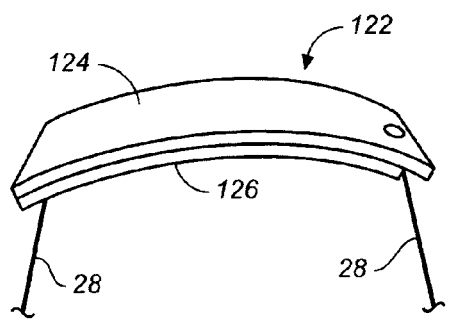
Figure 8A:
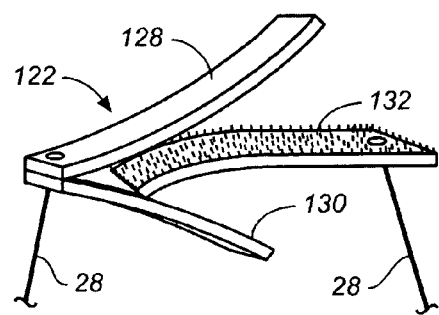
FIGS. 8a and 8b are perspective views of the triple strap embodiment of the hook and loop fasteners incorporated into the handle portion of the leash in open and closed mode, respectively.
Figure 8B:
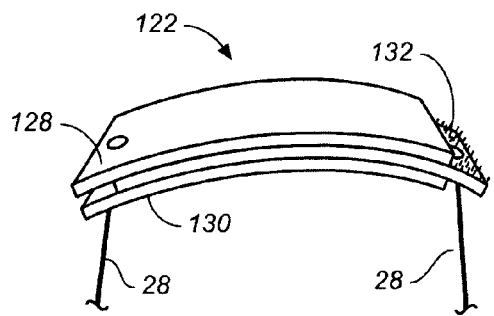

Alternatively, as shown in FIGS. 7–8 a hook and loop fastener 120, such as Velcro® made by Velcro USA Inc., may be used to form a handle with a detachable fastener. Hook and loop fastener 122 may be constructed of two rectangular strap portions, top portion 124 with loops on the inner side and bottom portion 126 with hooks on the inner side as shown in FIG. 7a in open mode (i.e., unlocked) and FIG. 7b in closed mode (i.e., locked). Alternatively, for a stronger locking mechanism, hook and loop fastener 122 may be constructed of three rectangular strap portions, top portion 128 with loops on the inner side, bottom portion 130 with loops on the inner side and middle portion 132 with hooks on both sides as shown in FIG. 8a in open mode (i.e., unlocked) and FIG. 8b in closed mode (i.e., locked).

Figure 9:
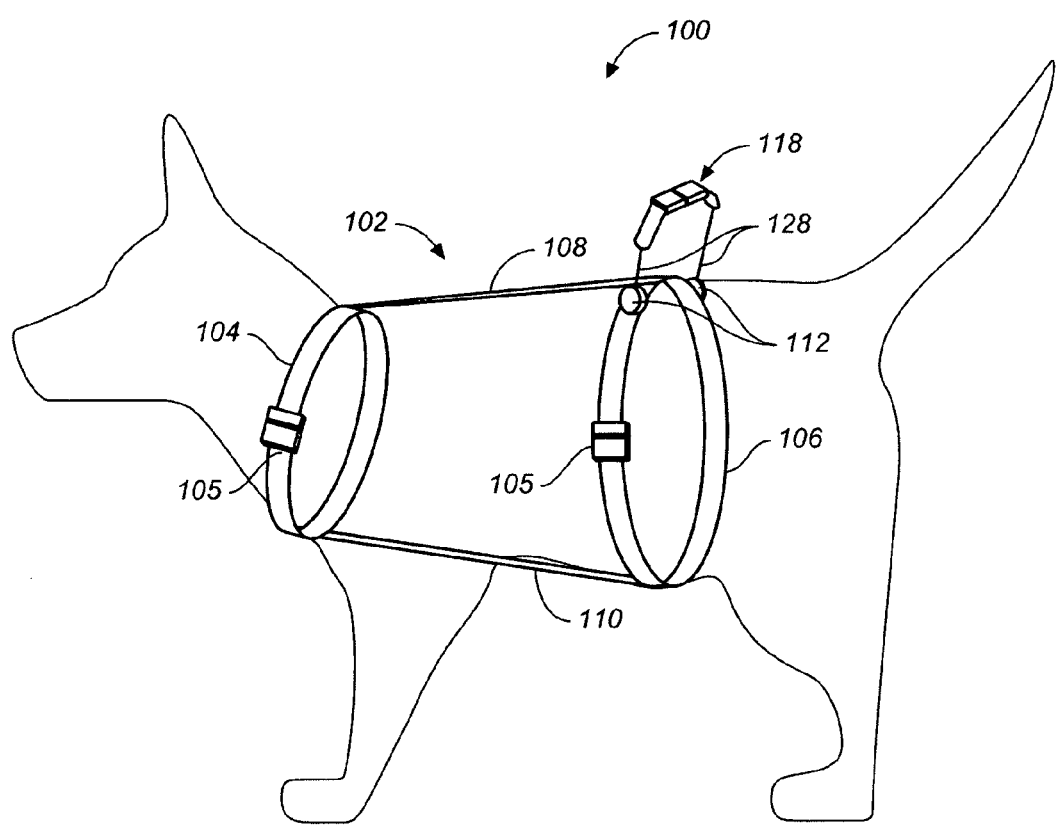
FIG. 9 is a perspective view of the harness embodiment of the integrated leash-collar.

An alternate restraint embodiment is depicted in FIG. 9. The retraction mechanism of collar-leash 10 is incorporated into a harness style restraint. As shown, harness-leash 100 includes a harness portion 102, in lieu of collar portion 12 of the preferred embodiment. Harness portion 102 is formed by a front circular strap 104 and rear circular strap 106, both of which wrap around the body of the pet and connect by buckles 105, and top connector strap 108 and bottom connector strap 110, both of which connect front circular strap 104 to rear circular strap 106. Retractors 112 are fastened to rear circular 106 of harness portion 102 in the same manner and function in the same way as described with respect to the preferred embodiment. As shown, the handle portion 108 and cables 128 are arranged laterally along the pet and harness portion 102, but alternatively may be arranged longitudinally along the pet and harness portion 102 by fastening retraction mechanisms to top connector strap 108.

From the above description, it will be apparent that the invention disclosed herein provides a novel and advantageous integrated pet restraint and leash. The foregoing discussion discloses and describes merely exemplary methods and embodiments of the present invention. One skilled in the art will readily recognize from such discussion that various changes, modifications and variations may be made therein without departing from the spirit and scope of the invention.

I claim:

1. An integrated pet leash, comprising:
   a restraint having an inner side and outer side;
   a handle having a first end and second end;
   first and second retraction members fastened to the outer side of the restraint; and
   first and second flexible elongated members:
   wherein the first flexible elongated member is coupled between the first end of the handle and the first retraction member, and the second flexible elongated member is coupled between the second end of the handle and the second retraction member;
   wherein the first and second retraction members exert a force on the first and second flexible elongated members toward the collar.

2. The integrated pet leash of claim 1, wherein the handle includes a first handle portion and a second handle portion detachably coupled together and configured to form a loop when coupled together.

3. The integrated pet leash of claim 2, wherein the first handle portion and the second handle portion are detachably coupled together by a latch mechanism.

4. The integrated pet leash of claim 2, wherein the first handle portion and the second handle portion are detachably coupled together by a hook and loop fastener.

5. The integrated pet leash of claim 1, wherein the first and second elongated members are constructed from steel wire.

6. The integrated pet leash of claim 1, wherein the first and second retraction members are retractable reels.

7. The integrated pet leash of claim 1, wherein the restraint is configured as a collar.

8. The integrated pet leash of claim 1, wherein the restraint is configured as a harness.

9. An integrated pet leash, comprising:
   means for restraining a pet having an upper side on top of the pet and an under side under the pet;
   means for holding the integrated pet leash;
   means for connecting the restraining means to the holding means;
   means for retracting the connecting first means into an unextended position and for housing the connecting means in the unextended position;
   second means for retracing the connecting means into the unextended position and for housing the connecting means in the unextended position;
   wherein the first and second means for retracting are located on the upper side of the means for restraining; and wherein the first and second means for retracting exert a force on the means for connecting toward the means for restraining.

10. The integrated pet leash of claim 9, wherein the holding means includes a first handle portion and a second handle portion detachably coupled together and configured to form a loop when coupled together.

11. The integrated pet leash of claim 10, wherein the first handle portion and the second handle portion are detachably coupled together by a latch mechanism.

12. The integrated pet leash of claim 10, wherein the first handle portion and the second handle portion are detachably coupled together by a hook and loop fastener.

13. An integrated pet collar and leash, comprising:
a collar having an inner side and outer side;
a handle having a first end and second end; and
first and second retractable reels each having a retraction mechanism and a cable connected to the retraction mechanism, wherein the first and second retractable reels are fastened to the outer side of the collar a distance approximately from the first end of the handle to the second end of the handle;
wherein the cable of the first retractable reel is connected to the first end of the handle, and the cable of the second retractable reel is connected to the second end of the handle;
wherein the first and second retractable reels exert a force on the handle toward the collar to hold the handle adjacent to the collar.

14. The integrated pet collar and leash of claim 13, wherein the handle includes a first handle portion and a second handle portion detachably coupled together and configured to form a loop when coupled together.

15. The integrated pet collar and leash of claim 14, wherein the first handle portion and the second handle portion are detachably coupled together by a latch mechanism.

16. The integrated pet collar and leash of claim 14, wherein the first handle portion and the second handle portion arc detachably coupled together by a hook and loop fastener.

17. The integrated pet leash of claim 1, wherein the restraint has an upper side on top of the pet and an under side under the pet; and wherein the first and second retraction members are located on the upper side of the restraint.

18. The integrated pet leash of claim 13, wherein the collar has an upper side on top of the pet and an under side under the pet; and wherein the first and second retractable reels are located on the upper side of the collar.

* * * * *